US005631077A

United States Patent [19]

Carlisle

[11] Patent Number: 5,631,077

[45] Date of Patent: *May 20, 1997

[54] IMMERSION-PROOF NON-PELLICULAR INTRA-MATRIX AQUEOUS BARRIER PROCESS

[76] Inventor: John C. Carlisle, 2505 Wendell Ave., Louisville, Ky. 40205

[ * ] Notice: The term of this patent shall not extend beyond the expiration date of Pat. No. 5,460,849.

[21] Appl. No.: 538,276

[22] Filed: Oct. 2, 1995

Related U.S. Application Data

[63] Continuation of Ser. No. 241,394, May 11, 1994, Pat. No. 5,460,849.

[51] Int. Cl.[6] ....................................................... B32B 3/06

[52] U.S. Cl. ......................... 428/306.6; 427/11; 427/180; 427/204; 427/429; 428/331; 428/332

[58] Field of Search ................................. 427/4, 11, 180, 427/204, 393.4, 427, 429; 428/306.6, 331, 332

[56] References Cited

U.S. PATENT DOCUMENTS

| | | | |
|---|---|---|---|
| 204,098 | 5/1878 | Sawyer | 427/204 |
| 655,813 | 8/1900 | Tornauw | 427/204 |
| 757,361 | 4/1904 | Stoffer | 427/204 |
| 800,197 | 9/1905 | Wolffenstein | 427/4 |
| 1,901,678 | 3/1933 | Turner | 427/204 |
| 2,418,525 | 4/1947 | Pollack | 427/393.4 |
| 2,500,770 | 3/1950 | Pierce | 427/255.6 |
| 2,698,809 | 1/1955 | Fessenden | 427/4 |
| 2,937,155 | 5/1960 | Eastes et al. | 427/393.4 |
| 3,035,988 | 5/1962 | Cohen | 427/4 |
| 3,041,140 | 6/1962 | Alexander et al. | 427/11 |
| 3,180,754 | 4/1965 | Acker | 427/220 |
| 4,525,425 | 6/1985 | Church | 427/255.4 |
| 4,749,590 | 6/1988 | Klingen et al. | 427/208.4 |
| 4,937,104 | 6/1990 | Puhringer | 427/337 |
| 5,024,711 | 6/1991 | Gasser et al. | 427/204 |
| 5,266,354 | 11/1993 | Tohyama et al. | 427/204 |
| 5,279,854 | 1/1994 | Kendall et al. | 427/203 |
| 5,460,849 | 10/1995 | Carlisle | 427/180 |

OTHER PUBLICATIONS

Trademark Reg. No. 1,746,645.

Tulco Chemical Company Brochure. No date shown.

*Primary Examiner*—Michael Lusignan

[57] ABSTRACT

A method by process for providing a liquid-free, toxic-free, environmentally friendly, non-transfiguring, flame and fire retardant, immersion-proof, non-pellicular and intra-matrix type aqueous repellent protective barrier to preferred substrates by various related embodiments, with particular utility toward dermal materials, both natural and synthesized. Methods enable durable and complete 'breathable' treatments that are generally capable of virtual weightlessness and invisibility, without utilization of liquids. Complete process is particularly adaptable to 'pocketable' packageability that is extremely cost-effective, undamageable, and longevous in shelf-life. Methods embodied generally include steps of (1) one or more specific, yet optional and/or elective substrate pre-treatment preparations capable of providing necessary functions utilized to qualify treatment potential of subject substrates, wherein such functions include conditioning or enhancing substrate textures or properties that would become integral with the quality level of the protective matrix formed by the process, (2) application of embedding and/or impregnating substrate(s) with specific fine, dry, organic silane-treated particulate materials, by utilizing specific procedure, apparatus, and modes of force that enables and ensures a highly simplified multi-performance immersion-quality all-aqueous protective barrier providing additional qualities of: no addition of gloss or glare, no odor, profound inconspicuity, and substantial added flame and fire retardance.

23 Claims, No Drawings

IMMERSION-PROOF NON-PELLICULAR INTRA-MATRIX AQUEOUS BARRIER PROCESS

This application is a continuation of application Ser. No. 08/241,394, filed May 11, 1994, now U.S. Pat. No. 5,460, 849, patented Oct. 24, 1995.

BACKGROUND OF THE INVENTION

1. Field of the Invention

This invention relates to a treatment to a base material, substrate, or article, (referred to henceforth only as substrate), and particularly to a method by process for impregnating and/or embedding dry particulate matter (referred to henceforth only as compound) into and/or through substrate(s) so as to provide same with a complete or substantially complete protective all-aqueous barrier that adds substantial flame and fire retardance properties to same substrate(s) without adding, utilizing,, or producing liquids, formed films (as such generally produced by a coating), solvent flash, flammables, odors, fumes, toxics, or virtual mass or weight.

2. Description of the Prior Art

There are both old and new substrates in need of, or requiring substantial protection from the damaging or decomposing effects caused, or initiated by various forms of aqueous penetration and/or adhesion thereto. It is with regard to such, and especially such substrates as have here to fore been essentially unprotectable, that effort to develop the present invention was initiated and so directed. These essentially unprotectable substrates have remained so, except to be object of process(s) that inherently produce such properties that are strongly objectionable and/or are use-diminishing to a substantial extent, with regard to valued characteristics of same substrates. Such process(s), being prior art, do commonly within their limitations, substantially reverse critical and necessary physical properties of many delicate, and/or process-sensitive substrates. Such are many and varied, and include suede and related leather, buckskin, and other dermal or folical substrates such as hair, feather, and fur; also various natural or synthesized substrates and compositions thereof, which would include paper (s) and fabric(s), as well as other porous and semi-porous substrates. In an effect to protect such, and with great oppress, it has been the preferred technique to coat or impregnate same with process(s) requiring fusing, heating, melting, drying, curing, or such, and other such as formulations containing liquids, (or requiring 'wetting-out' of substrates), as in utilization of solvents, film-forming vehicles and resins, waxes, oils, and the like, many of which are with great objection as they eventually migrate or deteriorate with great presence. Some of the various side-effects produced, and/or properties exhibited by these process(s) that are not a part of the present invention, which are often objectionable, or cause damaging effects or characteristics to substrates, that reverse, deter, or impair the usefulness of same, are, but are not limited to the following: (1) required wetting-out (usually with subsequent irreversible color change being the least objection), (2) solvent flash, to the environment, with fumes and odors, (3) drying or curing phases including expenditures of time, and other, (4) substantial added weight, and/or mass, (5) added gloss or glare, (6) non-drying and/or greasy-oily migrating films, or (7) film-forming substances that stiffen the substrates and/or which in turn may produce hardening of same, with subsequent additional cracking, peeling, flaking, and such of the applied finish, and/or the substrate. Of particular concern, as well, is the fact that the most satisfactory treatments and process(s) available for use as protectants for a substrate, and especially such that are individually and/or collectively predominantly soft, pliable, flexible, 'downy', heavily-textured, or relatively thin or delicate in nature, are treatments or process(s) that (8) require care and/or cleaning of an application device, (9) are sprayed from a cannister (or such), whereby polluants are dispersed into an environment (usually along with a very substantial portion of the protectant materials, (10) substantially alter or diminish the appearance or other valued characteristic, (11) exhibit yellowing and/or darkening and/or other color changes with age, (12) have a limited useful shelf-life, especially in an adverse storage environment, (13) in use or storage, creates difficulties with regard to contained toxics, corrosives, flammables, or such hazards that are subject to reactions with temperature, humidity, or such conditions that range and vary, (14) in use or storage, creates difficulties with regard to cleaning, treating, or correcting inadvertant spills, under or over-applications and the like, (15) difficult, if not impossible to remove from substrates as necessary, (16) do not add flame and fire retardance to substrates, yet often the reverse, (17) add substantial weight or bulk, (18) add unwanted sheen or glare, (19) require 'in-limbo' time phase between process application and state of serviceability, (20) destroys, or substantially impairs 'breathability' inherent to substrate, (21) require heat and/or other powered mechanical drying or other such curing, (22) require substantial skill, training, or patience in their application.

It has now been found that the present invention is of process so simplified, as to be totally exempt of all the aforementioned (22) encumberments, and is adaptable to a wide range of large or small scale applications to substrates that are both in-process, or post-process of manufacture. Without the use of liquids, the present invention is capable of producing invisible, and nearly-invisible virtually instant protective applications; is greatly simplified in cost and in use; is scaleable to a single 'pocketable' device that is totally maintenance-free, environmentally friendly to a great extent, and is capable of totally waterproofing materials and articles, in-the-field, (or anywhere), with great expediency, within virtually any environmental condition, with such simplicity, that utilizations can be effected even without the aid of, or presence of visible light.

SUMMARY OF THE INVENTION

It is an object of the present invention to substantially inhibit effects, both destructive and other, caused or initiated by aqueous adhesion to, and/or penetration of various materials and articles, both natural and synthesized, some of which have until the present been effectively, or virtually unprotectable.

It is a further object of the present invention to provide multiple modes of application(s) and process(s) that utilize solventless, liquid-free formulations of generally virtually inert dry particulates to effect high-speed, cost-effective, immersion-proof waterproofing capabilities for surfaces, and especially such here to fore virtually unprotectable.

It is yet another object of the present method to provide a means by process(s) by which substrates can be treated (fast and efficiently), by persons without the benefit of sight or vision.

It is another object of the present method to provide a means by process(s) by which substrates can be effectively proofed against damage, or effects caused by adhesion or penetration of most all aqueous media, regardless of situation or condition of environment prevailing at time and place means is provided.

A further object of the present method is provision of aforementioned benefits of process(s), without utilization of generally undesireable and unfriendly matter, including encumbrances inherent therein, which in turn, will delete same process(s) from 'hazardous', or 'toxic' listing by codes and entities, wherein OSHA, ADA, OSHA-TLV, OSHA-PEL, EPA, EPA-CERCLA, EPA-SARA, CAA CLASS I CAA CLASS II OZONE DEPLETING (for both product content and product manufacture), TITLE III TPC, D.O.T., TARC/OSHA/NTP CARCINOGEN, ACGIH, REACTIVITY (including HAZARDOUS DECOMPOSITION, INCOMPATIBILITY POLYMERIZATION, or GENERAL), USRCA, and others, are included.

These and other objects of the present invention are accomplished by impregnating (by specific process), pores and such strata of substrates, with graded and surface treated, inert and dry particulates, utilizing specific procedure of process(s) which enables the quality of such impregnating, and wherein included are such procedure that enable simultaneous cleaning and/or removal of oils and such contaminates from pores and such strata, wherein such removal is often integral with, or qualifying to same impregnating. Other procedure of process(s) includes such procedure wherein utilization of a single, greatly simplified, simple non-powered hand-held device (requiring no cleaning or maintenance), effects the present process, wherein it provides substrates with substantially unique, and instant protection against such as electrical conductivity, fire and flame, emmissions of glare, staining and color-change, stiffening and hardening, loss of pliability (including softness or delicacy of texture), and general degradation initiated by aqueous penetration.

For a more complete understanding of the present invention, reference is made to the following detailed description and examples.

DESCRIPTION OF THE PREFERRED EMBODIMENTS

Particulate materials also referred to herein as 'compound (s)', utilized in the present method are all commonly known, described, and commonly or readily available commercially to those that would be skilled in the art. However, these same materials are such that are putative and/or purveyed with regard to specific applications and utilizations, wherein such utilizations, which are not embodied in the scope of the present process, are commonly employed as additives to liquids mainly for purposes of thickening, or structured filling, or adding flow characteristics. Among the few non-liquid common applications for this type of material(s), are for use as a free-flow behavior enhancer to powdered substances, such as gun powder, or fluidized-bed polymers, and the like. In addition to these, is utilization as a trace additive, (mainly with plastic materials), for the purpose of reducing un-wanted static charges during the conveying of same. The specific fine, dry particulates utilized for forced embedment in the surface strata of articles treated by the present method can be various mixtures of the types and classifications that will be described herein. Size, and surface treatments, as well as surface configurations, can vary within a mixture of these particulates, however specific description will be made regarding results of extensive exploration that makes possible such determinations as 'preferred' and/or 'limited use'. No mixture of of these various particulates is necessarily 'best' generally, as substrate surfaces vary in properties, as well as consistencies, and at least some simple exploratory tests generally would be required for each such surface, in order to make determinations as to a 'best mixture', with regard to any specific such surface. Particulates suitable for utilization within the scope of the present method will be described here generally in order of preference, with regard to nominal size and surface treatment as noted. The most useful and preferred particulates are marketed as hydrophobic silicon dioxide, such being produced by various entities. Generally, such preferred particulates are referred to most commonly as colloidal hydrophobic silicon dioxide, and are obtained synthetically by flame hydrolysis, wherein reasonably pure coagulated silicon dioxide aerosol is rendered into fumes of same, wherein such fumes represent particle sizes ranging from approximately 7, to 45 nanometers (average diameter), most commonly referred to in terms of surface area, wherein square meters per gram is utilized. These particles are made hydrophobic in nature by reacting with organo silanes, such as dimethyl dichlorosilane, and others, wherein such reaction converts hydrophillic silanol groups associated with the silicon dioxide content of the particles, (silanol groups average approximately 1000 per particle, wherein particle size is 100 square meters per gram), into hydrophobic methyl groups in great extent, producing particles that are virually surface treated so as to be chemically hydrophobic, and hence will not absorb water. Further, the content of such particles remains approximately 99.8% silicon dioxide, and thus is virtually durable and inert, as well as generally translucent, in nature. Such characteristics provide a media that is extremely stable, non-reactive, and most preferred for utilization in the present method(s). Particle sizes most preferred for utilization in the present method(s) are generally in the range of 80–130 (square meters per gram—average surface area). This general range has proven most useful for embedment into most substrates, especially dermal and folical strata therof. Other sizes that are commercially available range from approximately 60–300, and are useful, yet less so due to various factors, such factors being mostly with regard to the finest sizes of approximately 180–300. One such factor being an inherent lack of ability to be securely interlocked into substrate(s) porosity characteristics that are generally present in the strata of such substrate(s), wherein adaptability to intra-particle 'packing', and interlocking, is also a part of same lack of ability. Such ability, and adaptability, are primary requirements of the present method(s), wherein the particles, by means of same present method(s), are forced to become interlocked physically, with one another, (and combined with) the finest defined characteristics of the strata of most substrates tested, wherein such combining and interlocking produce the unique durability that is consistent and predetermined within the scope of the present method(s), and wherein, the particle size range testing most favorable, generally was within 80–180.

Other suface treatments available on such particulates include hexamethyl-disilazane, dimethyl-siloxane, and other closely related organo silane types, all of which have tested generally as 'useful', or comparable to dimethyl dichlorosilane, with regard to many applications of the present method(s)

Other silicates, including silicates of alumina, (being surface treated as with aforementioned particulates), can be utilized, but are suited only to an extremely limited range of applications of the present method(s), due primarily to conspicuous opaque color, excessive weight, relatively simple 'plate-like' particle configurations which do not lend well to effective or durable interlocking characteristics (such as described earlier), and general lack of various other physical characteristics.

It is with due concern for a simplified, complete and comprehensive understanding of the various embodiments and adaptions of the present method(s), by those that would be skilled in the art, that the following general and clarifying, descriptive and definitive notations and statements are listed here as follows;

Generally, particulates compounded only from organo silane (silicon) surface treated, fumed silicon dioxide, are preferred.

It is a fact that applications of the present method(s) are often possible and practical to substrates that contain aqueous matter, in that the physical embedment of particulates utilized in same method(s) is capable of the simultaneous displacement of same aqueous matter.

Generally, and not without great object, all particulates utilized in the present method(s) are environmentally friendly, and are produced by means that are same.

The actual weight of matter (wherein such is preferred particulates) added to substrate(s), within the scope of the present method(s), is generally less than 15% of that which would be so added by 'old', or such alternative process(s).

Applications of the present method(s) are capable of performing useful function at temperatures which could exceed 550 degrees Fahrenheit, or the maximum service temperature of the subject substrate(s), due mainly to the relatively high ignition point of the particulates. Associated with same, is the substantial addition of flame and fire retardance to same substrate(s), due partly to aforementioned ignition point (which is generally in excess of 1600 degrees F.), and partly to the thermal insulation capabilities of same particulates.

Shelf-life, and general longevity of storage capability of same particulates (and compounds thereof), and most all apparatus employed to effect the present method(s), is great, and generally in excess of 65 months, and without need of costly protective packaging.

Valued characteristics of subject substrates, especially such that are generally delicate, flexible, or sensitive to aging and stiffening, are greatly enhanced in terms of longevity, such being provided by application of the present method(s). Among such characteristics are suppleness, softness, deformability, elasticity, and 'breathability' (such being the ability to pass air throughout all its dimensions).

Inherent 'electrostatic' means effected by the process(s) of the present method(S), are in fact simultaneously generated during same process(s), and utilized as so simultaneously generated by forces of motion that are part of same process (S). Such 'electrostatic' is in reference only to electrical phenomena caused by electrons which are present in every matter, wherein the effects attributed to the term 'electrostatic', are actually in no way static, as such effects are always traceable to the activity of charging, wherein such charging as is effected by procedure of the present method(s), is with regard generally to a relatively slow displacement of charges within relatively inferior conductors, wherein such are (1) particulates, or compound thereof, and/or (2) substrate(s), and/or application devices or apparatus that contact either (1), or (2), or both (1) and (2) individually or successively in any order, or both (1) and (2) simultaneously. These forces of charge do aid in the embedment of particulates into and/or through many subject substrates, by providing an adherent means to and between particulates and substrate. However such adherent means is generally temporary, and not vital, strategic, or necessary.

A substrate treated and protected by present method(s) that is with, or without any quantity of such treatment, may be re-treated at any time, any number of times, without the need or requirement of any surface preparatory procedure, with exceptions generally limited only to removal of post-treatment accumulated foreign, or substantially contaminating substance(s), such exceptions being generally obvious. Associated with same, the treating of a substrate by application of the present method(s), in no way inhibits the future application of any other type of protective finish, or treatment, with the exception of some water-based types, (with very few exceptions, no surface preparation, or removal of material associated with existance of, or prior treatment by the present method(s) would be required).

The scope of the present method(s) is embodied most particularly in the specific, and structured process(s) of application procedure, which provides necessary and integral knowledge from exploration and evaluation of (1) substrate surface strata, with regard to specific parameters of condition and/or content requirements, (2) methods that provide or ensure same condition and content requirements, (3) specifications of particulates that are most necessary or significant, (4) device or apparatus utilized to force structured embedment of particulates, with regard both to simplicity, and effectiveness of purpose, (5) significance of, and directive methods enabling minimized contamination of same particulates during embedment, and (6) defining the most simplified and direct methods of implementing the required embedment of the intra-matrix structure built of particle and substrate strata which is formed by the present method(s).

The ability of the particulates, utilized in the present method(s), to penetrate and fill, or coat microscopic hollow 'shafts' contained in or on various substrate matter, is made possible by the specific mode(s) of application employed in the present method(s), and is a unique property therof. One of the most useful and protective functions of such capability is the substantial inhibiting of the freeze-thaw cycling mode of substrate destruction.

It is a basic object of the present method(s) to effect the most useful and complete structured placement of said particulates to subject substrates in such manner as to insure minimum contamination (by oil, wax and other such non-aqueous matter) to the surfaces of same particulates, especially said surfaces which will represent the outermost texture of the so treated same substrate, whereby such object provides maximum performance qualities of aqueous rejection, wherein penetration is minimized, and repellency is maximized.

As confirmed by visual demonstrations provided for military defense and expeditionary personnel (US only), many various unique and viable employments of the present method(s) do exist for applications to equipment, protective clothing, and various apparatus, as such applications can be performed on-site, in all field situations, and in virtually any climate or environment, wherein instant protective measures can be effected by persons unskilled in the art.

It is with great object, and with regard, most specifically to the inherent use-restricting properties, general mass and weight, complexities of procedure, general conspicuity, and other encumbrances of 'old' or alternative process(s), that the general utility and specific values of the present method (s) become best defined.

The effects produced by combined specific requirements that are necessary to the process of most useful and effective embedment of said particulates into subject substrate(s) do, multifariously surpass and exceed the mere 'placement', 'dusting', or 'rubbing-in', or 'tumbling-in' of same particulates into same substrate(s), wherein these terms of mere placement do not effect substantial, durable, or effectively proficient means of affixing, and are not part of the present method(s), but are vastly transcended by the specific means of process that is the present method.

The term 'immersion quality', as utilized herein, relates to a standard of completeness of an aqueous barrier, which would equate to such barrier being generally unpenetrable by water when subjected to the forces of pressure exerted thereon by test of being held submerged in water for substantial periods of time.

The term 'force of motion', as utilized herein, with reference to embedment procedure, relates to specific methods of forcing, or impacting said particulates, wherein force and motion is applied to same particulates with object of durable affixing, and/or lending required velocity to same particulates, with same object. Forces utilized are such that most effectively allow specific placement criteria and parameters that involve movement, and motion of the particulate matter, and especially with respect to the contact with the surfaces of the subject substrate, and the movement and motion of the finest defined texture(s), (or strata(s)) present on the surfaces of same substrate(s).

The term 'aqueous', as utilized herein, with reference to (barrier to, or protection from), generally includes rain, drizzle, mist, fog, sleet, snow, steam, dew, frost and ice (as in transfer to and from water), humidity, vapor, condensation in general, and most other aqueous.

The term 'degradation initiated by aqueous', relates generally to microbial 'attack', mold, mildew, decay, rot, and the like.

The terms 'substrate' or 'subject substrates' relates generally to items, materials, articles, or matter subject to protection by present method(s), wherein such are generally porous, semi-porous, osmotic, permeable, and/or heavily or finely textured of some nature. Generally excluded are such surfaces as polished metal, glass, and the like.

The terms 'compound', 'particulates', 'compound mixture', and 'particulate matter', generally relates only to the specific types and sizes utilized as embedment media in the process(s) of the present method, and are all interchangeable as utilized.

The terms 'matrix' and 'intra-matrix' relates only to the new and non-pellicular surface formed on subject substrate (s), and is the general combining, and intra-combining of particulates, and the least dimensional components of same substrate strata, such being the prime predictable object of the present method(s), and wherein, such formed is uniquely non-pellicular, wherein such is in reference to the 'non-skin-forming' character of same intra-matrix formations.

The term 'flowables' relates generally to substrate surface contaminants, that are liquid, or semi-liquid, or able to flow or otherwise migrate in such manner, such being generally oils, wax-like, or similar, other than aqueous. Such flowables are not to be confused with trace quantities of resinous or other matter that either (1) remain in surface strata of subject substrate(s) that have been surface prepared, or (2) are present in the same surfaces of most all such substrate(s) as naturally occuring, and in such trace quantities. Both (1) and (2) are variable in quantity, as so occuring, yet both generally are integral and structural device, and/or criteria which contributes partially utilized adherent and interfixing properties to the intra-matrix formations of the present method (s).

The terms 'organo silane', and 'organo silicon', are generally interchangeable, and are in regard to particulate surface treatments, as aforementioned, and such that are similar, or associated.

Aspects of substrates being Significant, Contributing, and Remedial, as relating to process(s) of the present method:

Generally, except in situations where time does not permit, or substrate is pre-qualified, pre-embedment surface preparing, and/or conditioning usually enhances the qualities of effectiveness, and/or durability of treatment produced by the present method(s), wherein such conditioning is performed by utilizing one or more specific, yet optional or elective substrate surface preparations capable of providing effective functions utilized to qualify, or verify embedment potential of same substrate, wherein such functions include such as cleaning, conditioning, or expanding substrate surfaces and textures, wherein object of such would be adding to the quality of the protective matrix formed by the present process. A 'pre-qualified' substrate would be such as clean dry paper, or clean dry wood, or clean dry suede leather, generally a surface that is somewhat porous, free from oily or waxy contaminants, and generally in a state of soundness, wherein the surface strata, or texture thereof is sound, and in tact, rather than (degraded, 'dusty', decayed, loose, and not in tact, or not structurally attached to the sub-surface). A pre-qualified, or qualified substrate generally requires no pre-embedment surface treatment. A generally complete example of a qualified substrate would be, a feather in its natural state, as obtained from the living donor, without the presence of any foreign matter, save for such that is only trace in quantity; or a generally clean, sound, object of soft pliable leather that is brushed free of loose matter, or a generally clean, sound wooden surface that is freshly sanded to a fineness of approximately 180 to 240. The single surface condition that must always be dealt with is a contamination of oil, grease, or such viscous matter, except in very trace quantities. Generally, as is practical, all such flowables, that are not aqueous, must be removed, or greatly reduced, or greatly nullified, as excess of such, readily absorbs into the surfaces of applied particulates, wherein excess of such absorption greatly impairs the repellent qualities of same particulates, as such are only aqueous repellent in nature, and with the exception of silicone oils, and few others, such oily substances are somewhat hydrophillic in nature. The surfaces of particulates that will be faced most outward, in the finished matrix, must be protected from contamination by such oils and contaminants, throughout the embedment process of same particulates. Various specific surface preparation procedures have proven extremely effective in the general 'qualifying' of substrate surface strata, and are often an integral function of the relative quality of the intra-matrix so formed, and as such, are included in the scope of the present method(s), and are generally involved within the following parameters: Surface preparations to substrates are not always necessary. Knowledge of the surface characteristics of subject substrate(s), generally by test, specification, or inspection, aids in the selection of procedure that would provide the most simplified, and direct mode of process capable of fulfilling desired requirements of speed, cost-effectiveness, durability, or other such that may be essential. In summary, the greater part of all the knowledge about a subject substrate that could be useful, can be provided by determinations that are mostly with respect to either (1) flowable, or absorbable contents on, or within a subject surface, that are not aqueous, or (2) distinct or discernible lack of, porosity, access to available porosity, or intactness in same surface. Both (1) and (2) can be dealt with simply, as required.

Substrates to be treated for conditions, both (1), and (2): STEP A, remove condition (1). Such being as complete, and non-destructive as practicable, wherein basics objects are; not spreading or compounding effects of contaminants, further, or deeper, within substrate surface strata. STEP B, treat condition (2). Such basics objects being; removal of portions of substrate that are no substantially intact with same substrate, or are in a structural condition that is substantially degraded; removal of a quantity of substrate, that will expose inherent porosity characteristics of same substrate; or, removal of trace quantity of substrate, by abrading, (or other means), wherein object is to expand the available surface area (especially in fineness) that is generally, clean, new, and/or exhibiting properties of texture that are increased, and more complex, wherein results of such object, exemplify characteristics that are most desired, within an intra-matrix formed by present method(s). When only condition (1) exists, remove, as aforementioned, in. STEP A. When only condition (2) exists, treat as aforementioned, in STEP B, wherein such most always provides a more desired, and expanded, contaminant-free, contributing texture.

Media that can be effectively utilized for abrading, and abrasive cleaning, is wide ranging, with respect to grade, or fineness, and/or general design, and includes, but is not limited to; 1. abrasive paper or fabric, in grades generally from 120 to 400 fine, 2. flexible or deformable abrasive 'pad' media, non-metallic, (same grades as 1.), 3. metallic 'wool' abrasive media, in grades generally of #3, through #00. Other abrasive means could be utilized effectively, however, these mentioned would serve most often, for most substrates. Selective abrasive conditioning to substrates serve many objects, among such are: to open, and/or to expose, and/or to produce, minute pores, crevices, undercuts, and the like, which will effect, or provide surfaces with greatly enhanced potential for the general, holding, entrapment, bonding, and such affixing of said particulates. Abrasive treatment of subject substrate surfaces, (even when such employment is of the finest grades), can effect a contributing smoothing and cleaning, or such that is un-smoothing and cleaning.

Extensive exploration, of subject substrate surface properties and characteristics, as such relates to applications of the present method(s), has proven most useful in providing information on which the present method(s) were developed and solidified. The same information provides most all that is known and useful about the best known procedure for implementing the intra-matrix surface structure, within same surface characteristics, by same procedures, as best relates specifically, and individually, substrate, by substrate. Such explorations, and associated determinations, are in such volume and intricacy, as to be so misplaced herein, except as accessed in the following examples.

FIELD TESTS. EXAMPLE A

With particular regard to the novelty and utility of a unique applicability, this example is with regard to effecting a preserved state to an extensively groomed animal (as in 'show prepared' quality of grooming), wherein animal is a dog, 28 inches in height, and wherein such as follows would relate to other animals, domestic, agricultural, or other such kept.

Permeability by aqueous adhesion and/or penetration of an animals pasterns, (including 4 each, forelegs, and paws), cause staining of fur, matting of fur, and a general accumulation of matter, staining, and other such, wherein such is transferred to said animal by vehicle of dew, frost, casual water, or other such aqueous source.

Such cause and effects are quickly, safely, and cost-effectively inhibited to a great extent, by application of the present method, wherein 4 areas of detergent-washed fur surfaces (of approximately 36 square inches, collectively), are treated, utilizing particulate compound that is 100 through 170 in fineness, and worked into said fur surfaces by application with bristle brush, wherein such brush is generally common in design, being hand-held, wherein bristle block is ½ inch by 1 inch, bristles are nylon and polyester, of 0.011 inch diameter by 1 inch in length (from tip to base of block).

Said application is made with speed and ease, wherein expenditures are approximately 5½ minutes, and $0.90.

Removal of application, if required or desired, would be effected with even more speed and ease, requiring little effort, and ordinary soap and water.

Conspicuity of said application is generally related to being invisible.

Prime benefits here are invisibility, speed, simplicity, and absolute utility.

In the interest of simplifying, a more quantitative listing of benefits associated with this example, (and others, B and C, that follow) is provided, following the presenting of all examples A, B, and C, wherein a more detailed and comprehensive collection of such facts are assembled, and wherein each such listing is attributed to to each such example so associated, by corresponding reference letter A, B, or C, that follows each such listing.

FIELD TESTS. EXAMPLE B

This example is with regard to application to a paper document, such being a topographical map, such being printed on generally common paper, wherein no protective treatment such as a coating, or such is evident. Two such maps are utilized in this test, being such that are identical, and wherein each is 51 centimeters square in surface size, and folded 4 times, (enabling storage and portability in a pack, or pocket. Both maps are new, and un-used.

Each map is unfolded, and re-folded, then weighed accurately to within 1/1000th of a gram. One map is then treated by the present method, utilizing particulate compound that is size 85 through 170 in fineness, and applied to each side of the map, utilizing a brush (that is much to small for this size surface), that has a block dimension of ¾ inch by 1¼ inches, and bristles that are nylon, being 0.0068 inch diameter by 0.438 inch in length (from tip to base of block). Compound is poured out onto map surfaces, and worked into surfaces using a generally circular motion of said brush, wherein moderate pressure is hand applied. During a time period of approximately 3½ minutes, the ultra-fine particulates are worked into the map surfaces (which are virtually contaminant-free), wherein such particulates are forced into the pores of said surfaces, and lodged, and packed into same such pores. The minute fibrous 'feathers' of the paper composition become inter-locked within the inter-locking of the same particulates, wherein such feathers are generally sub-micron sized, in part. This treatment (embedment), when completed, is not visible, and affects the appearance of the paper, or printing thereon, in no way.

Next, each map is sprayed with approximately 2 fluid ounces of generally pure rain water, wherein each side of each map is contacted with approximately 1 ounce of said water, such map surfaces being generally vertical when so sprayed. Each map is picked up, and shaken lightly, approximately 15 seconds after said spray application is completed.

Next, and directly after maps are shaken, (wherein water that is not attached, or bonded to said map surfaces, drips or 'rolls' free of same) each map is weighed, then laid on a flat, dry surface for 10 minutes.

Next, each map is wiped, very, very softly, using dry paper toweling, wherein the untreated map is more 'dobbed', rather than wiped, so as not to tear said map. At this point of the test, the treated map appears to be totally dry, and the un-treated map appears to be soaked-through, in approximately 70% of is surface area.

Maps are both weighed again, for the final time. A brief description of the completed test is outlined as follows:

TEST RESULTS EXAMPLE B

| | Treated map WT IN GRAMS | Un-treated map WT IN GRAMS |
|---|---|---|
| Specimen maps - original weight | 20.561 | 20.624 |
| Second weighing, after one is treated | 20.624 | 20.623 |
| Third weighing, following 'rain spray', 15 second time-lapse, and shaking | 20.902 | 40.464 |
| Final weighing, following 10 minute time-lapse, and gentle wiping | 20.736 | 32.576 |

Paper materials treated by the process described in example B, are dry, and serviceable immediatly following such treatment, and as such, may be folded and stored likewise. Such treatment affords substantial added fire and flame retardancy, as well as the aforementioned resistance to usual effects of aqueous related deteriorations. A more complete collection of benefits associated with example B are referenced in the aforementioned listing that follows examples, and are so referenced by indication of the letter 'B'.

FIELD TESTS. EXAMPLE C

This example is with regard to a feather, as in the preservation of an artifact, or a feather in current use.

Two feathers are selected for this test, such being physically identical in all aspects of appearance. Both specimens are from the same North American turkey, and are extremely thick and 'downy', to the extent of having thousands of 'air-like' folicles, such being the individual barbs, barbules, barbicels, and hamuli (in the order of descending fineness). Each feather is weighed, and one is treated, while on a reasonably flat surface, wherein the utilization of the present method of 'impacting' is preferred, and so applied by means of a simple hand-held terrycloth pouch measuring 2 inches, by 4 inches. Contained in the said pouch, is approximately one fluid ounce of said dry particulates of a size ranging from 85 to 180, and 30 plastic beads that are 3/16 inch in diameter, and having a specific gravity of 1.21. The application of the said particulates onto, and into the feather is accomplished by hand-impacting the pouch onto the surfaces of said feather, wherein such specific method is relatively dependable, and provides a very complete bonding, penetration, and embedment of the said particulates which is particularly invisible, and so complete as to be an impervious barrier to aqueous media, while being extremely durable.

It should be noted that this type of feather, as with most, is not waterproof or water repellent to any extent, and as such, is subject to absorbing and holding quantities of water that exceed its own weight by as much as four-fold, or more.

Following the treatment of one feather, both such are weighed again, then each is immersed and submerged in a container of rain water, and held there while being vigorously moved about therein, for a period of 5 seconds. After the 5 second period, each feather is removed, excess water that is not attached is shaken free, and each feather is then weighed, for the third time, followed by a re-immersing of each feather, in the same rain water, where each is submerged and held for a period of 5 minutes.

Following the said 5 minute period, each feather is removed, shaken once (as in being hand-held, and such 'once' being a single motion of the wrist), and then weighed a final time. A brief description of the completed test is outlined as follows:

TEST RESULTS EXAMPLE C

| | Treated feather WT in GRAMS | Un-treated feather WT in GRAMS |
|---|---|---|
| Specimen feathers - original weight | 0.230 | 0.219 |
| Second weighing - after one is treated | 0.235 | 0.219 |
| Third weighing, following 5-second immersion and 'single-motion-shaking' | 0.236 | 0.307 |
| Final weighing, following 5-minute immersion and 'single-motion-shaking' | 0.237 | 0.591 |

This example is such wherein said particulates are embedded within virtually all surfaces of an article by impacting (striking) said article with a simple fabric pouch containing said particulates, and plastic beads, such beads being utilized soley for added weight and mass to the impaction motions and moments of force so applied. Said particles utilized in this test, upon impacting said feathers surfaces, are driven into the 'pores' and like, of said surfaces, and most importantly, and more particularly, through existing surface contaminants that would generally be expected to be in some presence on, or about such said surfaces.

Just following the third weighing (referenced above), the un-treated specimen, such being 0.307 grams in weight, was in an appearance state of being quite 'wetted-out', and same specimen, just following the final weighing, in same test, at a point therein exceeding its original weight to a great extent, was also in a state of appearance such as to be totally devoid of original shape, and most other physical characteristics.

Many other testing procedures that have been conducted in the manner of examples A, B, and C, and verify such similar results, and involve various materials, including artifacts and products of papyrus, leathers, fabrics, furs, also written and printed documents of flexible and/or fragile and/or partially degraded and extremely fragile materials, as well as wood, bark, hide, and other dermal matter, and synthesized facimiles of all same such.

Field Tests A, B, and C as referenced to specific individual characteristics and general encumberments associated with prior art process(s) that are generally eliminated by the utilization of the present method(s) are summarized, and so referenced by same letters A, B, or C, as follows: (+ and – are indicative of relative value)

| Encumbrance Generally Eliminated | Field Test Association | | |
|---|---|---|---|
| All odors and such related fumes | A++ | B | C+ |
| Strongly objectionable 'wetting-out' requirements | A+ | B++ | C++ |
| Solvent flash as generally objectionable environmentally | A++ | B+ | C+ |
| Drying or curing - expenditures of time | A++ | B++ | C+ |
| Substantial added weight and/or mass | | B– | C++ |
| Added gloss, glare, or sheen | A | B | C+ |
| Added non-drying viscous with potential for migration | A | B++ | C++ |
| Strongly objectionable general use-restricting, and degradation failures related to formed films | A++ | B++ | C++ |
| General requirements of care, cleaning, or maintenance of application apparatus | A++ | B++ | C++ |
| Generally occuring substantial alterations and transfigurations to surfaces treated | A+ | B+ | C++ |
| Age-related 'yellowing' or darkening and such related chemical break-downs of matter utilized in producing a protective barrier | A+ | B | C |
| Substantial concern related to the general condition or state of 'useability' that may or may not exist in a supply of a protectant formulation | A | B++ | C++ |
| General and substantial concerns related to storage and use of protectant formulations that contain toxics, corrosives, or flammables | A++ | B | C |
| Concern regarding the difficulties of correcting inadvertant spills, or the 'under', or 'over-application to surfaces being treated | A+ | B+ | C+ |
| Substantial concern regarding the difficulty or general inability to effect the non-destructive removal of a protective treatment from a a surface so treated | A++ | B | C |
| Substantial concern for the flammability added to a surface treated by a protectant process | A++ | B | C+ |
| Substantial concern regarding the care and management requirements of the time period that is associated with the vulnerability of an applied protectant in-process of drying, or such state that is short of being serviceable | A++ | B+ | C+ |
| Substantial concern regarding the requirements of specific skills, or such related in the application of a protectant process | A+ | B | C |
| Substantial concern regarding the necessity of non-pellicular requirements of an applied protective finish | A+ | B | C++ |
| Substantial concern regarding requirements of inconspicuity necessary to the general utility of a protective finish (or treatment) | A++ | B | C+ |
| Possibility of a harmful, irreversible consequence | A++ | B++ | C++ |
| Possibility of harm to an environment, in general, or to a child, in particular | A++ | B | C |
| Spill hazard, or general 'liquid mess' potential | A | B++ | C |
| Need for environmental controls during the application of a protective process | A+ | B | C |

The scope of the present invention is embodied in the object of effecting a complete and durable, instantly serviceable and rapidly attained virtually invisible and distinctly non-pelicular protective aqueous barrier onto and/or into substrates and articles, by a process exhibiting great and unprecedentented simplicity of process, wherein such barrier is generally so effected in two steps. Step one, being an integrally functional aspect of the present method, is the necessary 'qualification' of the subject substrate (base material or article), wherein such qualification is completed by (a) having or acquiring the afore described specific pertinent knowledge regarding the condition (s), or qualities, of said substrate (or specific pertinent portions of surfaces, strata, or texture thereof); or (b) performing the specifically described (aforementioned) elective or necessary surface preparations to same substrate; or both (a), then (b), prior to application of the present method (s). Step two is the specifically described (aforementioned) application and structural affixing of said particulates into and within the least dimensional porosity and textural characteristics that are available within such surfaces that are to be treated, wherein such availability generally is utilized to the limits of practicality, thereby ensuring the most durable of applications.

The general durability, completeness, and overall effectiveness of the protective barrier so produced, is predictably assured by exercising (or performing) afore described selective procedure (s) that best utilize key factors and aspects of physical characteristics that are indigenous to the specific substrates subject to being so protected, and as such factors vary individually and inconsistently, some degree of 'art' is occassionally involved in the selection and performance of same procedures. Among such same aforementioned procedures that can prove to be most providing, are surface preparations with objects of which are to (a) increase or expand the fineness of, or quantity of the porosity/fibrosity, and texture available in or about a subject substrate, or (b) which is most critical, remove or effectively nullify such aforementioned 'contaminants' present in or about same substrates that could or would prevent the proper origination, or general effectiveness of the subject matrix-type structural barrier.

The general durability of the complete barrier produced by the present method is due to (1) the aqueous phobic nature and quality of the surfaces of the said particulates (when properly embedded), in combination with their so embedded and entrained closely integral proximity to one-another that exists when properly so affixed within said subject substrates; (2) implementation of necessary substrate pre-treatment or other said 'qualifying' procedures; (3) the particulate embedment/entrainment being effected by specific means that substantially limit the coating of same particulates by the said contaminants (that are most commonly (a) aquaphillic in nature, and/or (b) present on and/or in subject substrates; and (4) employment of specific modes of force utilized to embed said particulates in such manner as to effect such a complete and impenetrable interlocking of the said particulates (to and within one-another), and to and within the least-defined and most minute strata of said substrates. The most inert, translucent, and lightweight qualities of said preferred particulates enable complete protective barriers that are virtually invisible and non-obtrusive (or indigenous character reversing) within, or to the so treated said substrates.

Directive notations and explanations regarding significance of parameters that do lend quality and/or durability to the implementation of the present method (s) would include, but would not necessarily be limited to the following.

Embedment of particulates must be accurate, as afore and henceforth described, wherein 'limiting contamination' is most imperative. The particulates, when embedded and affixed by means that will be further defined, will generally without fault, form a complete 'matrix', or 'flexible web' that is uniquely non-pelicular and that is closely integral within the interlocking of the individual particulates, and within the strata of the subject substrate, including the most minute intra-fibrous nature of same such, in combination. However, such a matrix even though thorough, will not form a complete or effective aqueous barrier of any durability if the particulates are coated or so contaminated with such that is not aqueous. Contaminating substances must be dealt with as described afore herein, at 'specific surface preparations'. Other such related pre-application criteria requiring attention is so described as well.

Application and embedment of the particulates to a subject substrate is accomplished generally by the utilization of one or two of four variant methods. The most often preferred being 'impaction', or the impacting of the particulates onto and/or into the substrate, wherein such is accomplished by providing means that impel particulates with force and velocity, present at impact of the said particulates at and about surfaces of same substrate, wherein forced entrapment entrains and interlocks particulates within the most minute, even microscopic fibrous textures of such substrate. Inherent variations of individual particulate sizes and surface configurations of same, allow for this, wherein arrangements within the particulates, combined with, and within the voids and pores of the subject surface strata, form the intra-matrix structure of the present method (s). Most importantly, such forced particulates are so embedded, entrained, lodged, and so affixed in such manner as to inhibit the 'rolling or turning' motions of same, as same approach and contact the substrate surfaces that will be combined within the matrix structure being formed, especially same such particulates that will form the outer-most surfaces of the completed matrix. Extensive routine testing and evaluation procedures have shown this direct impacting process variant to be exclusively eminent, with regard to simplicity, utility, and fulfillment of limiting the contamination of the particulates, such being a prime and most critical object. Insuring minimum values for amounts of non-aqueous substances allowed to contaminate the matrix of entrained particulates, and most particularly the particulate surfaces that will remain faced most outward from the substrate treated, will provide the most effective and superior aqueous barrier. Lack of such aquaphillic contamination is a prime factor that is directly proportional to the durability of repellent properties, and overall effectiveness of the present process.

Variant means for proper affixing and embedment procedure involve forces of pressure and movement supplied by means such as: [1] Being a further defined text regarding means and device utilized for impact embedment of said particulates, is with reference to containers for same particulates that also function as an implement used to impact said substrates that are within the general scope of implemtnting the present method (s), wherein such implementation variant is closely related to procedure described afore herein at (Field Tests: EXAMPLE C). Adaptability of process is simplified most in the utilization of the impaction variant of the present method, wherein a single implement which is at least, in the part that contacts the substrate, generally a flexible/deformable porous membrane, and which contains the said particulates, such that will be employed to be embedded in same substrate, and is also the only container, implement, and packaging required for all that is necessary to implement the present method, (ellective substrate surface preparations not included). Such same container in its simplest form would be generally a 'pouch' or 'sock' configuration, wherein the closed end of such is the portion which both contacts the substrate, and contains said particulates, and wherein such particulates may or may not be mixed with much-larger diameter other material, wherein such other material is utilized soley for added weight, and/or mass, wherein such weight and mass would be contributing to forces applied to substrate surfaces at moments of impact with same, and wherein the remainder of the container could or would be utilized as a handle (when hand held as a hand-held manipuable implement), or an extension from the particle-containing portion thereof, which could be utilized as an attachment point to a power source other than the hand, wherein 'power source' would be equipment or apparatus supplying movement and/or velocity to the same container. In the simplest utilization, the container, if being a sock or the like with dimensions being approximately 3 inches wide, by 8 inches in length, would be hand-held by the open end (such being access for placement of said particulates, along with aforementioned 'other material' as desired, into or within said sock), wherein the closed-end of same sock would be the portion of such that contacts said substrates as such is impacted to surfaces of same substrate being treated, such impacting being generally accomplished with such motions of force as 'striking', or 'pounding' same closed-end (containing particulates), onto, and about surfaces of same substrate being treated, wherein forces of such motions are substantial and are sufficient as such, to accomplish substantial depth of embedment of particulates into and/or through strata that is available at surfaces of same substrate, wherein the impact upon same substrate utilizes such forces to impel same particulates through the portion of said sock that is contacting the same substrate (such portion being common woven cotton fabric, in its simplest form), and wherein same particulates being so impelled are driven onward into, and/or through same strata, wherein the effect of successive such force 'cycles' aid in further so-impelling same particulates already embedded, while simultaneously adding additional particulates to the said matrix structure thus being formed. Key advantages provided by this variable impaction method are [1a] overall simplicity of process, [1b] combined functions of seiving particulates (as same are 'filtered' through sock/membrane en-route to substrate surfaces), and effective embedment of said particulates, [1c] combined functions of providing complete applicator means, and complete container means, [1d] the complete embedment process is embodied wholly in a single most portable hand-operated implement, wherein provided is means of application of said particulates from a contained source to surfaces to be treated, embedment of same, some means of cleaning/conditioning same surfaces, sole source and container and packaging of same particulates, some means of post-treatment (removal of excess particulates), and in-combination with 1a, 1b, and 1c, are all included. This preferred variant of the method by process of the present invention is characterized by a particularly reliable manner of storage, access, and operation especially and most valuably suited to specific natural and synthesized dermal and dermal-like material substrates, and more especially such same as plumage (wherein the barbs, barbules, barbicels, hamuli, and intra-hamuli components can all be proficiently treated and eminently protected, and most inconspicuously so). Obviously, the size or scale of such process, and apparatus so employed (within the scope of the present method), would be variable as to suit various requirements.

[2] Being apparatus that is generally bristled brushes, wherein consistency of bristles, as well as configurations of handle portions would vary to suit requirements regarding both individual applications, including delicacy or size and scope of subject substrate surfaces. Brushes could be utilized that are of a design that would include (as part of the handle portion), a particulate-containing reservoir that may or may not self-feed same particulates toward and/or to the bristled portion of same brush. The objects of brush selection are multi-purpose and so-varying, in that the brush design selected may be capable of more than one function, either within the function of the embedment procedure, or within all or part of [2a] surface preparation to subject substrates effected prior to particulate embedment, wherein a soft brass-bristled brush of a general type may be employed as a cleaning/surface-conditioning implement that could be utilized for surfaces such as suede leather, or other such, or [2b] wherein the same such brush as selected for the function of [2a] could also be employed for discrete entrainment/embedment of said particulates, and [2c] wherein a function of a brush would be the conveying of said particulates from source of same, to the areas of surfaces being so embedded. Selection of a bristled instrument for use as a particulate application device may be based soley on such as delicacy or fineness that may be required of the bristles, which may reflect the fineness, delicacy, or fragility of the subject substrate that same such bristles would contact (within the embedment procedure). Brushes utilized for embedment procedures would generally be non-destructive toward the surfaces being embedded, wherein such as configuration, or structural condition of same such surfaces would be factors in the selection of such being so utilized. Extreme circumstances such as would or could be encountered in the embedment of surfaces such as valuable or irreplaceable artifacts, or such (to which the present method is perfectly suited), may require equally extreme measures of discretion in the selection of bristled implements utilized for such embedment. It should be understood that applications of the present methods could be designed wherein such as craftsmanship, or even extreme such may play an integral part (or may be a critical factor) of the general quality of such applications, so designed. Within the scope of the present method(s), variations of bristled implements, with regard to their variations of utility, have been explored to a great extent. Objects of such exploration, mostly with respect to capabilities of such implements, in their ability to effectively entrain particulates within subject substrates, and in-combination with their ability to render such entraining while effecting a minimum of the aforementioned particulate contamination, have shown that such implements generally selected as most useful or expedient in such entraining and effecting, have bristles that are relatively 'stiff' (as opposed to flexible), relatively 'fine' (as opposed to coarse), and relatively 'un-feathered' at the surface-contacting tips. It has also been determined that some creativity (and/or specific applicable exploration, or testing procedure) is sometimes utilized, or necessary in the selection of such bristled implements, as same such should vary in characteristics so as to be best suited to varying substrate surfaces. Wide-ranging configurations of bristled brush type implements are applicable to effective embedment procedure, and may be selected so as to suit individual substrate surfaces, wherein bristles may be of materials that include metal, fibre, polymer, composite, or other, and wherein all such are capable of being extremely effective means of device for implementing embedment within the scope of the present method(s), wherein the afore herein described brushing-in of said particulates as applied to various substrates, does in fact provide a simultaneous cleaning and/or conditioning of some substrates, wherein successive brushing 'action', as applied to same some substrates and said particulates (simultaneously), does remove said 'flowables' and such matter of contamination from the surfaces and strata of some substrates, such removing being due to both the slightly abrasive nature of same particulates, combined with the flowables absorption capabilities of same particulates, quantities of which are contacting same substrates while being applied to same, yet are eventually brushed out-of and off-of same substrates, as excess that does not remain as part of the protective matrix barrier formed.

[3] Being such apparatus not contacting surfaces of substrates, wherein such provides impaction of same particulates onto and/or into and/or through same substrates, wherein particulates are generally mixed with other materials, wherein such other materials are generally larger and heavier, per unit, than the said particulates being embedded, and wherein the said larger other material is utilized for added weight and/or mass only (and as such is not entrained in substrates), and wherein such apparatus supplies a source of said particulates, a source of said other heavier material (optional), and a source of force (and/or velocity), wherein such force being sufficient to impact both the said particulates (and other material when utilized) onto and/or into, or through said substrate surfaces, wherein said particulates are effectively embedded and/or entrained therin, and wherein such other material (employed as added weight and mass, only, in the object of so impelling particulates), departs from said substrate surfaces, along with excess particulates, generally by deflection from the force of impact at or near same substrate surfaces, wherein both the so deflected other material, and excess particulates (not embedded or entrained in same substrate surfaces), are generally reclaimable, and available for further same utilization. Such apparatus variant, in its simplest form, would comprise a containment vessel, for containing said particulates (which may or may not be mixed with said other material), such vessel being situated vertically above subject substrate to be treated, and wherein same vessel would contain said particulates (mixed with said other material, if utilized), and wherein said vessel has means of entry for supply of same particulates and materials, and separate means for exit of same particulates and materials, wherein said vessel is a hopper, basin, or such configuration, and wherein said means of exit is a valved spout, chute, or such outlet, from which same particulates and materials are gravity-fed to same substrate surfaces to be treated, wherein force of gravity imparted to same particulates and materials is adjusted to suit embedment requirements by selection of linear distance that is the distance between point of exit from said valved outlet, and general point(s) of impact at said substrate surfaces being so impacted. An obvious variant regarding the functions of such apparatus is wherein vessels (rather than vessel) applies, and wherein such are generally of the same similar function, and wherein two or more are utilized to supply said particulates and said other materials, wherein one such vessel could supply particulates of a specific specification, and a separate vessel could supply particulates of another specification, and a separate vessel could supply said other material, and so on, wherein selection of which such supply is allowed to exit such vessels could be made, and wherein each such vessel may contain said particulates of a specific size range, wherein each same such vessel may contain mixtures of any or all such mentioned particulates and/or such mentioned other materials, and wherein mixing of any or all such particulates and/or materials may take place in the space that is between the said exit point(s) of said vessels, and the said general point(s) of impact at said substrate surfaces, and wherein same such mixing may take place at or near the same such general point(s) of impact at same said substrate surfaces. Obviously such apparatus as the foregoing could have numerous variations that would remain in the general scope of the methods of the present invention, among such would include [3a] Generally the foregoing, but with the added utilization of air or gas pressure as an alternate to gravity, for generating needed velocity to said particulates and said other materials, and wherein direction of flow of same said particulates and materials could be varied from vertical planes to horizontal planes, and wherein length of said linear distance could be shortened. Objects of all such variants generally would be to supply said particulates and said other materials to surfaces of said substrates, wherein such apparatus is a supply of said particulates and materials, a supply of velocity or such force of motion to same particulates and materials, and wherein such apparatus does not contact said substrate surfaces.

[4] Being such apparatus as hard-surface dies, rollers, brayers, or burnishers, and the like utilized as means to force said particulates into and/or through said substrate strata, wherein such substrates as sheet-goods and the like may be effectively embedded with said particulates, wherein such means would be effective in the 'pressing-in' of same said particulates, wherein said substrates could be 'dusted' or 'sprinkled' or so deposited with said particulates, with such being followed by said means to force said particulates, wherein such is accomplished by said means of rollers, dies, and the like, wherein such means supply force of pressure and movement while in contact with said such sprinkled surfaces of same substrates, wherein such force and pressure so supplied would be means to so embed and affix same particulates into and/or through same surfaces as such means contact same surfaces and so placed particulates simultaneously, wherein such means may be constructed of metal or other generally hard surfaced material, and wherein such may have such contacting surfaces that are smooth or textured or the like, so as to suit objectives required as such would relate to individual and varying such substrate strata (or characteristics), and wherein such contact by said means could also, simultaneously if desired, ellectively alter and/or effect general change thickness, shape, or other such physical characteristic of same such substrates.

It is noted here that embodiments and adaptions of the methods of the herein described invention (such being a method by process), other than those herein presented, as well as variations, modifications, and equivalent arrangements will be obvious to those skilled in the art due to the completeness intended in the foregoing descriptions thereof, without departing from the substance or scope of the present method(s) of invention. Accordingly, the foregoing disclosure is not intended to limit the present invention, rather it is meant to be appreciated by those who would be skilled in the art; that alternatives and variations may be made without departing from the spirit of the invention, wherein it is believed that claims constitute a novel, useful, and unobvious method by process that is within the purview of the Patent Statute.

What is claimed is:

1. The process of constructing an aqueous repellent barrier interlocked to and over a material, comprising the following steps, step (c) being optional when steps (a) and (b) are combined, and step (b) being optional when steps (a) and (c) are combined:

(a) exposing a porous surface of a first material having a pore size capable of being penetrated by a second particulate material made from silicon dioxide reacted with an organo silane, said second particulate material having an average diameter of between about 7 and 45 nanometers, said first material being free of surface contaminants preventing contact of said second particulate material with said surface and/or pores, (b) impacting said surface and/or pores with second particulate material and partly-porous implement with a force sufficient to cause second particulate material to impregnate said pores and to interlock to and over said surface and within said pores thereby forming a matrix of said second particulate material and said surface and said pores, said matrix serving as an aqueous repellent barrier over said surface, and providing a fire, mold, and decay resistant final surface finish composition (c) applying said second particulate material onto said first material and said surface and/or pores by brushing, with a bristled brush, or rubbing with a partly-porous implement, the said second particulate material onto the first material and said surface and/or pores, utilizing sufficient pressure, agitation, and frictional force to cause second particulate material to impregnate said pores and to interlock to and over said surface and within said pores thereby forming a matrix of said second particulate material and said surface and said pores, said matrix serving as an aqueous repellent barrier over said surface, and providing an instantly-dry and not-slippery final surface composition.

2. The process of claim 1 including a first step of removing said surface contaminants from said surface and pores and/or abrading said surface and pores.

3. The process of claim 1 in which partly-porous implement contains second particulate material.

4. The process of claim 3 in which said implement contains a third material having an average diameter larger than said second particulate material, said third material adding weight to promote the impact of said second particulate material on said surface.

5. The process of claim 4 in which said implement contains a sieve preventing third material from impregnating said surface.

6. The process of claim 1 in which said implement is flexible and hand operated.

7. The process of claim 1 in which said surface is pretreated to remove contaminants from said surface and in said pores.

8. The process of claim 1 in which silicon dioxide is replaced by silicates of alumina.

9. The process of claim 7 in which said pretreated includes optional abrasive cleaning of said surface and said pores.

10. A product having a surface processed in accordance with the process of claim 1.

11. The process of constructing an aqueous repellent barrier interlocked to and over a material, comprising the following steps, steps (c) and/or (d) being optional when steps (a) and (b) are combined, and steps (b) and/or (d) being optional when steps (a) and (c) are combined, and steps (b) and/or (c) being optional when steps (a) and (d) are combined:

(a) treating a porous surface of a first material to remove contaminants from the surface and pores of said first material, said first material having a pore size capable of being penetrated by a second particulate material made from silicon dioxide and/or other silicates reacted with an organo silane and having an average diameter of about 7 to 45 nanometers, (b) impacting said surface and/or pores with second particulate material and partly-porous implement with a force sufficient to cause second particulate material to impregnate said pores and to interlock to and over said surface and within said pores thereby forming a matrix of said second particulate material and said surface and said pores, said matrix serving as an aqueous repellent barrier over said surface, and providing a fire, mildew, and freeze-thaw resistant finish composition (c) applying said second particulate material onto said first material and said surface and/or pores by brushing, with a bristled brush, or rubbing with a partly-porous implement, the said second particulate material onto the first material and said surface and/or pores, utilizing sufficient agitation and frictional force to simultaneously cause displacement of aqueous and other content of said first material surface and/or pores, and to cause second particulate material to impregnate said pores and to interlock to and over said surface and within said pores thereby forming a matrix of said second particulate material and said surface and said pores, said matrix serving as an aqueous repellent barrier over said surface, and providing an instantly-dry and not-slippery final surface composition finish (d) impacting said surface and/or pores with second particulate material by driving said second particulate material into contact with said surface and/or pores using s liquid-free gaseous stream containing said second particulate material, said impacting with force sufficient to cause second particulate material to impregnate said pores and to interlock to and over said surface and within said pores thereby forming a matrix of said second particulate material and said surface and said pores, said matrix serving as an aqueous repellent barrier over said surface, and providing an instantly dry and fire resistant surface finish composition.

12. The process of claim 11 in which said organo silane is selected from the group consisting of dimethyl dichlorosilane, hexamethyl-disilazane, dimethylsiloxane, and mixtures thereof.

13. A product or article having a surface processed in accordance with the process of claim 11.

14. The process of claim 11 in which partly-porous implement is flexible and hand-operated, and contains second particulate material.

15. The process of constructing an aqueous repellent barrier interlocked within and over a substrate, comprising the following steps, steps (c) and/or (d) being optional when steps (a) and (b) are combined, and steps (b) and/or (d) being optional when steps (a) and (c) are combined, and steps (b) and/or (c) being optional when steps (a) and (d) are combined:

(a) exposing a porous surface of a substrate having a pore size capable of being penetrated by a particulate material made from silicon dioxide and/or other silicates reacted with an organo silane and having an average diameter of about 7 to 45 nanometers, (b) impacting said surface and/or pores with said particulate material and partly-porous implement with a force sufficient to cause said particulate material to impregnate said pores and to interlock within and over said surface and within said pores thereby forming a matrix of said particulate material and said surface and said pores, said matrix serving as an aqueous repellent barrier within and over said surface, and providing a fire, mold, and decay resistant finish (c) applying said particulate material onto said substrate and said surface and/or pores by brushing, with a bristled brush, or rubbing with a partly-porous implement, the said particulate material onto the substrate and said surface and/or pores, utilizing sufficient agitation and frictional force to simultaneously cause displacement of aqueous and other content of said substrate surface and/or pores and to interlock within and over said surface and within said pores thereby forming a matrix of said particulate material and said surface and said pores, said matrix serving as an aqueous repellent barrier within and over said surface, and providing an instantly dry flame resistant composition finish (d) impacting said surface and/or pores with said particulate material by driving said particulate material within said surface and/or pores using a liquid-free airstream containing said particulate material, said impacting with force sufficient to cause said particulate material to impregnate said pores and to interlock within and over said surface and within said pores thereby forming a matrix of said particulate material and said surface and said pores, said matrix serving as an aqueous repellent barrier within and over said surface, and providing an instantly dry and fire retardant surface finish composition.

16. The process of claim 15 in which partly-porous implement is flexible and/or hand-operated, and contains said particulate material.

17. A product or article having a surface processed in accordance with the process of claim 15.

18. The process of claim 15 in which said organo silane is selected from the group consisting of dimethyl dichlorosilane, hexamethyl-disilazane, dimethylsiloxane, and mixtures thereof.

19. The process of claim 15 in which said surface is pretreated to remove contaminants from said surface and in said pores.

20. The process of claim 15 including a first step of removing said surface contaminants from said surface and pores and/or abrading said surface and pores.

21. The process of claim 16 in which partly-porous implement contains a second particulate material having an average diameter larger than said particulate material, said second particulate material adding weight to promote the impact of said particulate material on said surface.

22. The process of claim 16 in which said partly-porous implement contains a sieve preventing said second particulate material from impregnating said surface.

23. The process of claim 15 in which silicon dioxide is replaced by silicates of alumina.

* * * * *